United States Patent [19]
Shober et al.

[11] Patent Number: 5,649,295
[45] Date of Patent: Jul. 15, 1997

[54] DUAL MODE MODULATED BACKSCATTER SYSTEM

[75] Inventors: R. Anthony Shober, Red Bank; Giovanni Vannucci, Middletown Township; Gregory Alan Wright, Colts Neck, all of N.J.

[73] Assignee: Lucent Technologies Inc., Murray Hill, N.J.

[21] Appl. No.: 492,173

[22] Filed: Jun. 19, 1995

[51] Int. Cl.$^6$ .................. H04B 1/40; H04B 1/59
[52] U.S. Cl. .................. 455/38.2; 455/73; 455/106; 455/517; 342/51
[58] Field of Search .................. 455/38.2, 49.1, 455/54.1, 54.2, 73, 106, 19; 340/572, 573, 825.54; 342/44, 51, 50

[56] References Cited

U.S. PATENT DOCUMENTS

| | | | |
|---|---|---|---|
| 2,259,227 | 8/1941 | Pescod | 340/825.54 |
| 4,075,632 | 2/1978 | Baldwin et al. | 343/6.8 R |
| 4,360,810 | 11/1982 | Landt | 343/6.8 R |
| 5,252,979 | 10/1993 | Nysen | 455/73 |
| 5,317,309 | 5/1994 | Vercellotti et al. | 340/825.54 |
| 5,319,802 | 6/1994 | Camiade et al. | 455/54.1 |

Primary Examiner—Chi H. Pham
Attorney, Agent, or Firm—John A. Caccuro

[57] ABSTRACT

A radio communication system includes an Interrogator for generating and transmitting a first modulated signal by modulating a first information signal onto a radio carrier signal, the first information signal indicating in which of multiple response modes a receiving Tag should respond. One or more Tags of the system receive the first modulated signal and decode it to obtain the first information signal. A Backscatter Modulator modulates the reflection of the first modulated signal using a second information signal whose content, data rate, or modulation is determined by said first information signal, thereby forming a second modulated signal. The Interrogator receives and demodulates the second modulated signal to obtain the indicated second information signal.

26 Claims, 4 Drawing Sheets

DUAL MODE MODULATED BACKSCATTER SYSTEM

RELATED APPLICATIONS

Related subject matter is disclosed in the following application filed concurrently herewith and assigned to the same Assignee hereof: U.S. patent application Ser. No. 08/492,174, entitled "Full Duplex Modulated Backscatter System," inventors John A. MacLellan, R. Anthony Shober, Giovanni Vannucci, and Gregory A. Wright.

FIELD OF THE INVENTION

This invention relates to wireless communication systems and, more particularly, to a wireless communication system using modulated backscatter technology.

BACKGROUND OF THE INVENTION

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. In RFID systems, the Interrogator communicates to the Tags using modulated radio signals, and the Tags respond with modulated radio signals. Most commonly, this communication utilizes Time-Division Duplex (TDD) or Half Duplex techniques. After transmitting the message to the Tag (called the Downlink), the Interrogator then transmits a Continuous-Wave (CW) radio signal to the Tag. The Tag then modulates the CW signal using modulated backscattering where the antenna is electrically switched, by the modulating signal, from being an absorber of RF radiation to being a reflector of RF radiation. This modulated backscatter allows communications from the Tag back to the Interrogator (called the Uplink).

Prior art Modulated Backscatter (MBS) technology is described in U.S. Pat. Nos. 4,075,632, issued Feb. 21, 1978 to H. A. Baldwin et al. and entitled "Interrogation, And Detection System," and 4,360,810, issued Nov. 23, 1982 to J. A. Landt and entitled "Multichannel Homodyne Receiver". MBS systems typically utilize the amplitude modulated techniques described above for communications from the Interrogator to the Tag, and utilize MBS for communications from the Tag to the Interrogator.

RFID applications exist which have different data rate and range requirements. To accomplish great range, the data rate, especially in the Uplink, must be reduced. This is accomplished by backscatter modulating an unmodulated subcarrier onto a received CW signal for a duration of a few tenths of a second. The Interrogator then listens for an unmodulated tone on the reflected CW signal after the CW signal has undergone homodyne detection.

In order to implement higher bit rates, the Tag would generate an information signal, modulate that information signal upon a subcarrier, and use that modulated subcarrier to backscatter modulate the CW radio signal. In the Interrogator, after detection, the information signal is then demodulated from the subcarrier signal.

Undesirably, such prior art RFID systems are generally "single mode", in the sense that the Tag is capable of operating at either long range mode or higher bit rate mode rather than being capable of operating in both modes.

SUMMARY OF THE INVENTION

In accordance with the present invention, a radio communication system includes an Interrogator for generating and transmitting a first modulated signal by modulating a first information signal onto a radio carrier signal, the first information signal indicating in which of multiple response modes a receiving Tag should respond. One or more Tags of the system receive the first modulated signal and decode it to obtain the first information signal. A Backscatter Modulator modulates the reflection of the first modulated signal using a second information signal whose content, data rate, or modulation is determined by the first information signal, thereby forming a reflected second modulated signal. The Interrogator receives and demodulates the second modulated signal to obtain the indicated second information signal.

DETAILED DESCRIPTION

There are RFID system applications which have very different data rate requirements for the Downlink (Interrogator to Tag) and the Uplink (Tag to Interrogator) directions. One such class of applications involves using RFID technology to read information from a Tag affixed to a container or pallet. In this application, the container is moved (e.g., by being pulled by a small truck) across the reading field of an Interrogator. The reading field is defined as that volume of space within which a successful transaction can take place. While the Tag is in the reading field, the Interrogator to Tag transaction must be completed. Since the Tag is moving through the reading field, the RFID system has only a limited amount of time to successfully complete the transaction.

In such an application, the Tag could be moving as fast as 10 meters/second through the reading field. The reading field would consist of a roughly conical volume, extending 5 meters away from the Interrogator, and the cone having an angle of roughly 60 degrees total spread (30 degrees to either side of a direct path from the Interrogator to a point immediately in front of the Interrogator). Given this situation, the RFID communications with each Tag must be completed in less than 0.5 seconds.

Therefore, effective RFID systems must be able to a) have the Tag detect the presence of the Interrogator in a very short period of time, and b) have the Tag to Interrogator data rate be sufficiently large such that the communications can be completed within the time period available. Furthermore, the system must work even if several Tags are in the reading field at the same time. Given these constraints, an Uplink data rate of 50 Kbps, or perhaps greater, may be desirable.

Other application of this RFID system calls for the Tag to be interrogated at distances significantly greater than 5 meters, with the same downlink signal used by short-range Interrogators. To support this greater range, the Downlink data rate must be limited to keep the signal-to-noise ratio acceptable. An example of these alternative applications was discussed in pending U.S. patent application Ser. No. 08/206,075, entitled "Modulated Backscatter Wireless Communication System Having An Extended Range," now abandoned in which Tags were used as Electronic Shelf Labels to display correct prices on a supermarket shelf. In this application, Downlink data rates of about 1 Kbps are used.

Therefore, an object of the present invention is an RFID system that achieves synchronization rapidly, even with a relatively low-speed Downlink and having a relatively high-speed Uplink to send the necessary Tag data rapidly even in the presence of multiple Tags in the reading field.

Figure 1:
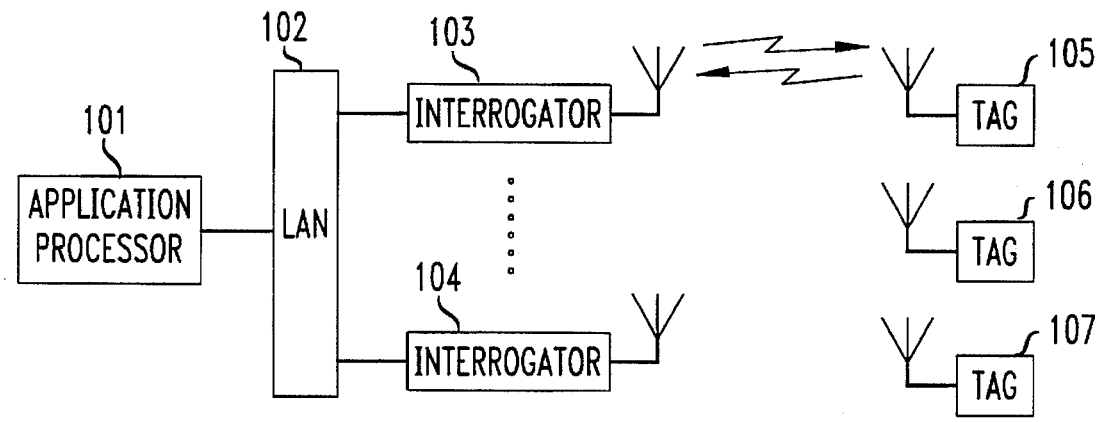
FIG. 1 shows a block diagram of an illustrative Radio Frequency Identification (RFID) system.

With reference to FIG. 1, there is shown an overall block diagram of an illustrative RFID system useful for describing the application of the present invention. An Applications Processor 101 communicates over Local Area Network (LAN) 102 to a plurality of Interrogators 103–104. The Interrogators may then each communicate with one or more of the Tags 105–107. For example, the Interrogator 103 receives an information signal, typically from an Applications Processor 101. The Interrogator 103 takes this information signal and Processor 200 properly formats a Downlink message (Information Signal 200a) to be sent to the Tag. With joint reference to FIGS. 1 and 2, Radio Signal Source 201 synthesizes a radio signal, the Modulator 202 modulates this Information Signal 200a onto the radio signal, and the Transmitter 203 sends this modulated signal via Antenna 204, illustratively using amplitude modulation, to a Tag. The reason amplitude modulation is a common choice is that the Tag can demodulate such a signal with a single, inexpensive nonlinear device (such as a diode).

In the Tag 105 (see FIG. 3), the Antenna 301 (frequently a loop or patch antenna) receives the modulated signal. This signal is demodulated, directly to baseband, using the Detector/Modulator 302, which, illustratively, could be a single Schottky diode. The diode should be appropriately biased with the proper current level in order to match the impedance of the diode and the Antenna 301 such that losses of the radio signal are minimized. The result of the diode detector is essentially a demodulation of the incoming signal directly to baseband. The Information Signal 200a is then amplified, by Amplifier 303, and synchronization recovered in Clock Recovery Circuit 304. The Clock Recovery Circuit 304 can be enhanced by having the Interrogator send the amplitude modulated signal using Manchester encoding. The resulting information is sent to a Processor 305. The Processor 305 is typically an inexpensive 4 or 8 bit microprocessor; the Clock Recovery Circuits 304 can be implemented in an ASIC (Application Specific Integrated Circuit) which works together with Processor 305. This Processor 305 can also serve as the driver for an optional Display Unit 309 should this Tag require a display. The Processor 305 generates an Information Signal 306 to be sent from the Tag 105 back to the Interrogator (e.g., 103). This Information Signal 306 is sent to a Modulator Control Circuit 307, which uses the Information Signal 306 to modulate a subcarrier frequency generated by the subcarrier Frequency Source 308. The Frequency Source 308 could be a crystal oscillator separate from the Processor 305, or it could be a frequency source derived from signals present inside the Processor 305—such as a multiple of the fundamental clock frequency of the Processor. The Modulated Subcarrier Signal 311 is used by Detector/Modulator 302 to modulate the modulated signal received from Tag 105 to produce a modulated backscatter (i.e., reflected signal). This is accomplished by switching on and off the Schottky diode using the Modulated Subcarrier Signal 311, thereby changing the reflectance of Antenna 301. A Battery 310 or other power supply provides power to the circuitry of Tag 105.

Figure 4:
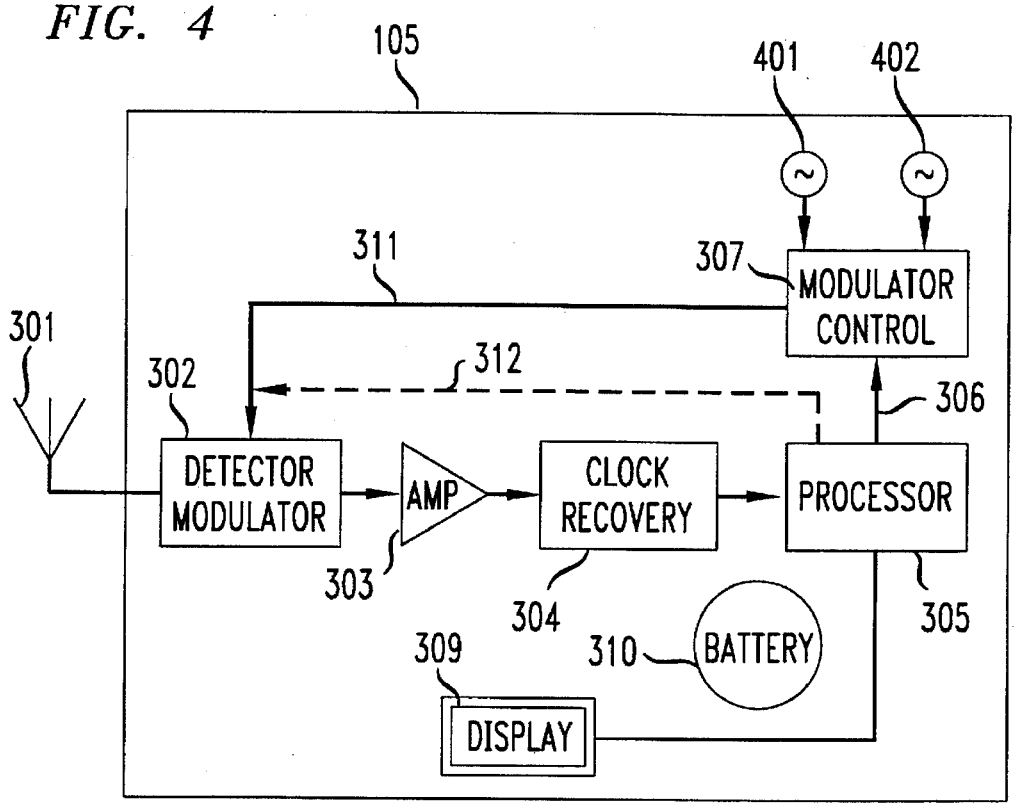
FIG. 4 shows a block diagram of an alternate embodiment of a Tag Unit used in the RFID system of FIG. 1.

There are a variety of techniques for using Modulated Backscatter (MBS) to send information from the Tag to the Interrogator. In some MBS technologies, the Modulator Circuit 307 of the Tag generates an amplitude modulated signal modulated by an Information Signal 306 at frequency $f_2$. If the Radio Signal Source 201 generates an unmodulated frequency $f_1$, then the Interrogator receives signals inside of the range $(f_1-f_2)$ to $(f_1+f_2)$, and filters out signals outside of that range. This approach could be termed the "MBS at baseband" approach. Another approach would be for the Tag to generate two subcarrier frequencies, generated by Frequency Sources 401 and 402, as shown in FIG. 4. The information could be conveyed in a frequency-shift keyed (FSK) fashion with the subcarrier frequency transitioning between these two frequencies. Other modulation schemes are possible as well, such as phase shift keying (PSK) of a single subcarrier frequency (e.g., BPSK, QPSK) or other complex modulation schemes (e.g., MFSK, MASK, etc.).

Returning to FIG. 2, the Interrogator 103 receives the reflected and modulated signal with the Receive Antenna 206, amplifies the signal with a Low Noise Amplifier 207, and demodulates the signal using homodyne detection in a Quadrature Mixer 208. (In some Interrogator designs, a single Transmit (204) and Receive (206) Antenna is used. In this event, an electronic method of canceling the transmitted signal from that received by the receiver chain is needed; this could be accomplished by a device such as a Circulator.) Using the same Radio Signal Source 201 as used in the transmit chain means the demodulation to IF is done using Homodyne detection; this has advantages in that it greatly reduces phase noise in the receiver circuits. The Mixer 208 then sends the Demodulated Signal 209 (if a Quadrature Mixer, it would send both I (in phase) and Q (quadrature) signals) into the Filter/Amplifier 210. The resulting filtered signal—then typically an Information Signal 211 carried on an IF subcarrier—is then demodulated from the subcarrier in the Subcarrier Demodulator 212, which then sends the Information Signal 213 to a Processor 200 to determine the content of the message. The I and Q channels of Signal 209 can be combined in the Filter/Amplifier 210, or in the Subcarrier Demodulator 212, or they could be combined in the Processor 200. Common practice would utilize error detection in both messages sent over the link from the Interrogator 103 to the Tag 105, and also over the link from the Tag 105 to the Interrogator 103.

Using the above techniques as an example, an inexpensive, short-range, bi-directional digital radio communications channel is implemented. These techniques are inexpensive as the components consist of (for example) a Schottky diode, an amplifier to boost the signal strength, bit and frame synchronization circuits, an inexpensive 4 or 8 bit microprocessor, subcarrier generation circuits, and a battery. Most of these items are already manufactured in quantities of millions for other applications, and thus are not overly expensive. The circuits mentioned above for bit and frame synchronization and for subcarrier generation can be implemented in custom logic surrounding the microprocessor core; thus, except for a relatively small amount of chip real estate, these functions come almost "for free." Such circuitry is, illustratively, described in the previously filed applications of Ser. No. 08/206,075, now abandoned and U.S. patent application Ser. No. 08/409,782, now U.S. Pat. No.

5,598,169 entitled "Detector and Modulator Circuits for Passive Microwave Links."

In accordance with the present invention, a Tag unit of an RFID system has the capability to operate in a "dual mode" fashion. The Tag, based upon a command from the Interrogator, responds to the Interrogator with either a "single tone" acknowledgment (to achieve great range) or with an information signal (for greater data rates at lesser range). The RFID system of the present invention may communicate using the well-known Time-Division Duplex (TDD), Half Duplex or Full Duplex techniques disclosed in the previously identified related application concurrently filed herewith.

The basic features of this invention are that a) the Tag must be capable of receiving a Downlink message; b) the Tag must be told what type of Uplink message it is to transmit, whether it be an actual data message (higher bit rate mode) or a "single tone" acknowledgment message (long range mode), based upon information received in the Downlink message; c) the Tag transmits the requested type of Uplink message; and d) the Interrogator interprets the Uplink message received in a proper manner. Several different types of acknowledgment messages in the long range mode can exist. Generally, an acknowledgment message has a data rate which is much less than the data rate of an actual data message (the higher bit rate mode), thus allowing filtering over a much smaller frequency band, and thus allowing greater range than the higher bit rate mode since the noise bandwidth of the received signal is lessened due to the narrowband filtering. Thus, an acknowledgment message could consist of a low bit rate data message, or it could consist of a single bit of information. To send a single bit of information, the Tag could generate an unmodulated subcarrier frequency which could be modulated onto the incident signal, using modulated backscatter. The Interrogator would then receive a reflected signal with a single frequency tone. Narrowband filtering techniques could then be used to reduce the noise bandwidth and determine the presence or absence of this signal.

Figure 5:
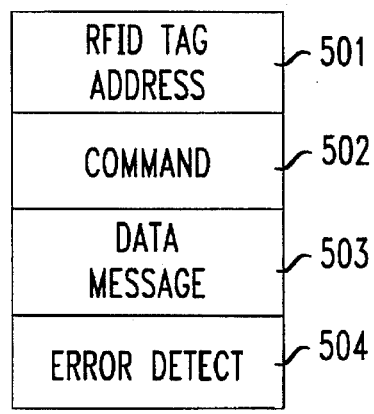
FIG. 5 shows the Downlink message format.

The Tag 105 detects and assembles the bits of information sent from the Interrogator 103 into a complete Downlink message. Typically, a pattern of synchronization bits is transmitted at the beginning of the Downlink message; these bits allow the Tag to acquire bit and message synchronization; enabling the Tag to determine the beginning and the end of the Downlink message. Well known synchronization techniques may be utilized, including the methods described in the previously identified copending application. Once the Downlink message is assembled, it may be of the form shown in FIG. 5. The RFID Tag Address 501 is the address of the Tag 105 to which the Interrogator 103 wishes to communicate. To keep the number of bits in the RFID Tag Address 501 as small as possible, this address might be a hashed index into a longer table of tag addresses. Then, the Interrogator 103 would have a certain probability of addressing the correct tag. The Command data 502 includes bits which direct the Tag to perform the correct function. For example, if data were to be stored on the Tag 105, the data could be sent in the Data Message field 503. The accuracy of the data could be insured by an Error Detect field 504. The Command data 502 or Data Message 503 portion of the Downlink message could indicate that the Tag 105 should return a Message to the Interrogator; for example, the Tag could return stored data, such as the Tag ID, or other application-specific data. Another type of Downlink message could indicate that the Tag should send back only a single-bit acknowledgment message.

Figure 3:
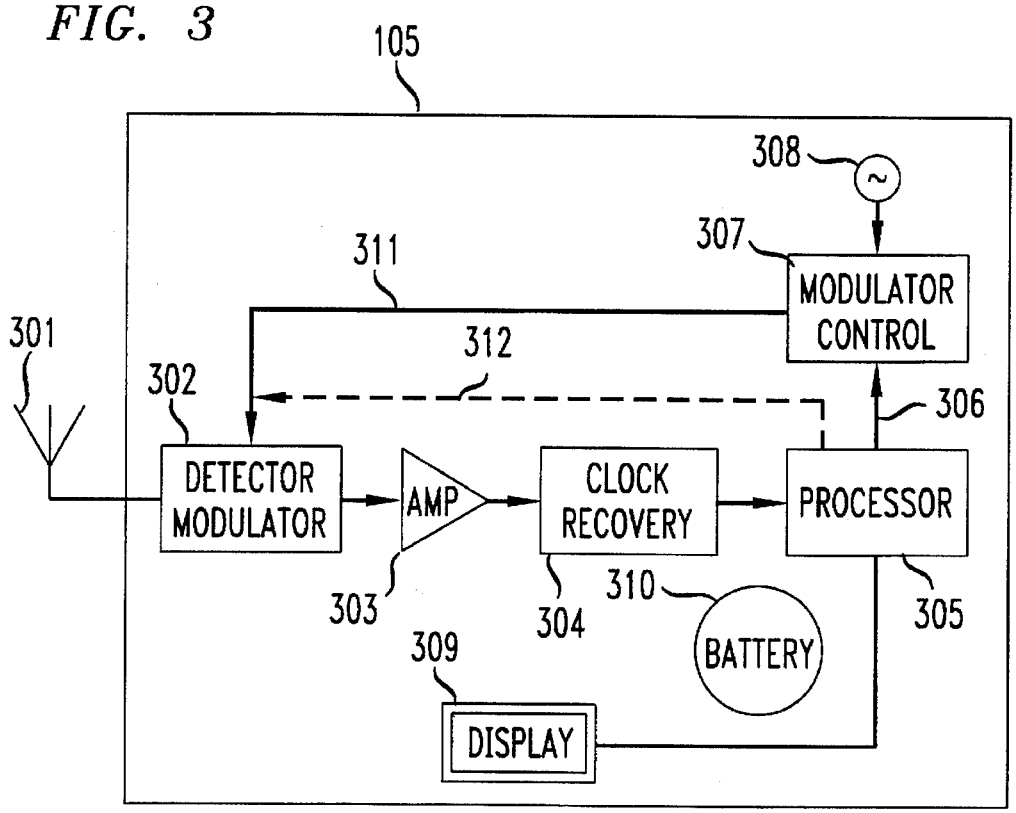
FIG. 3 shows a block diagram of a Tag Unit used in the RFID system of FIG. 1.

Thus, the Processor 305 of the Tag 105 determines, in response to information in the Downlink message, what type of Uplink signal to transmit: a data message or a "single tone" acknowledgment message. There are several ways that the Tag 105 may transmit either a data message (or information signal) or a single-bit acknowledgment message so that the Interrogator 103 can, relatively easily, receive and distinguish between these two different types of messages. Referring to FIG. 3, in the event that the Tag 105 is to send a multi-bit information signal, Processor 305 sends the Information signal to the Modulator Control 307, which modulates the signal from Subcarrier Frequency Source 308. The selection of the actual subcarrier frequency of the Frequency Source 308 is done with some care.

As disclosed in the previously referenced patent application 08/206,075, MBS systems exhibit noise in the Uplink signals due to reflections of the RF source from any number of reflectors. Walls and metal objects reflect RF radiation; these reflected signals are received by the Interrogator 103 at the same carrier frequency as they were transmitted. The Quadrature Mixer 208 is operated as a Homodyne Detector and thus is used to cancel these reflections. However, other reflectors generate reflected noise at frequencies away from the main carrier frequency—either from Doppler shifts or, more likely, from reflections off of electronic equipment operating at frequencies near the Subcarrier Frequency. One particularly difficult source of noise are fluorescent lights, which have been shown to produce noise not only at their fundamental 60 Hz (in the United States) frequency, but also at overtone frequencies well up into the tens of thousands of Hertz. The use of subcarrier frequencies that are above 50–100 KHz are especially useful in avoiding this noise.

In Tag 105, Processor 305 sends the Information Signal over the Information Signal Lead 306 shown in FIG. 3. In the event that Processor 305 of Tag 105 is to send a "single tone" message consisting of a single information bit, the Information Signal Lead 306 is maintained at a first logic state to indicate that no information message is to be sent. Thus, an unmodulated subcarrier frequency signal is outputted by Modulator Control 307. In the event that Processor 305 determines that a multi-bit message is to be sent, the Information Signal Lead 306 conveys the multi-bit message to Modulator Control 307. This multi-bit message (information signal) is then used to modulate the subcarrier frequency using one of several possible modulation techniques, such as amplitude, phase, frequency, or code modulation.

According to another embodiment (see Lead 312 of FIG. 3), Processor 305 may itself generate a subcarrier frequency modulated with the multibit information signal. In this case, for Processor 305 to send out a pure subcarrier frequency, the Processor will clock out, from an I/O port, the bit pattern "01010 101", with the zeroes and ones being clocked out at a rate of $2r_b$ clocks per second. This pattern generates a pure subcarrier signal at a frequency of $r_b$ cycles per second. In order to clock out an Information message, the Processor 305 clocks out a variant of the above bit pattern. For example, assume that Processor 305 is to clock out a Binary Phase Shift Keying (BPSK) modulated signal. Let $r_i$ be the information data rate, and let $r_b$ be the frequency of the subcarrier signal, as shown above. Assuming, for simplicity, that $r_b$ is an integer multiple of $r_i$, then $r_b/r_i$ is the number of "01" cycles that would be sent during one information bit period. To send BPSK, Processor 305 sends $r_b/r_i$ repetitions of "01", followed by $r_b/r_i$ repetitions of "10". This represents a binary phase change.

To clock out a Quadrature Phase Shift Keying (QPSK) signal, Processor 305 sends out $r_b/2r_i$ repetitions of one of the four QPSK symbols, such as "0110 0110 ... 0110", and then clocks out the same number of repetitions of the next symbol to be transmitted.

Finally, Processor 305 could also clock out pseudorandom sequences. For example, define two sequences of $2r_L/r_i$ bits and refer to these as sequences $S_1$ and $S_2$. Then, the Tag 105 transmits $S_1$ as a "0" information bit and $S_2$ as a "1" information bit. The use of pseudorandom sequences may be very beneficial over the above BPSK or QPSK examples in the event that the radio environment has impairments such as multipath fading or narrowband interferers. Considering the frequency and severity of these fades, it may be helpful to spread the Uplink signal in order for the Uplink path to be more resistant to such fades. The two sequences, $S_1$ and $S_2$, should be chosen to be nearly orthogonal.

The Interrogator 103 (FIG. 2) demodulates the subcarrier signal from the received RF signal, and then applies filtering. Given the specifics of the subcarrier frequency, a suitable filtering amplifier is utilized. Subcarrier Demodulator 212 then demodulates the subcarrier signal. The Processor 200 then performs the digital signal processing necessary to decode the information. In some implementations of this invention, the Processor may be a Digital Signal Processor (DSP); in others, a conventional Microprocessor could be used. To recover a "single tone" acknowledge signal from Tag 105, consisting of a single subcarrier tone, the filtering amplifier would be a narrowband filter. While conventional filter technologies could be used, it may be most effective to utilize the DSP mentioned above as a narrowband filter. The subcarrier frequency of this single tone is well known; as the Tag 105 would typically use an inexpensive crystal as the frequency source. Even with the limited accuracy of that crystal, the subcarrier frequency could be known to an accuracy of a few Hertz. Thus, very narrowband filters could be used. Since the acknowledge signal response from Tag 105 is used to extend the range of the RFID system and consequently would likely be a very faint signal, it places an additional burden on the narrowband filter of filtering amplifier 210.

Another way that the DSP mentioned above could be used is to dynamically search for the frequency components of the Uplink signal. This could be accomplished by performing a Fourier Transform on the incoming data stream, perhaps using a DSP, or using Processor 200 of FIG. 2. In this manner, the multiple signals representing a modulated subcarrier signal could be differentiated; or, a single subcarrier signal of uncertain data rate could be recovered by using the Fourier Transform to search for multiple signals.

Thus, the modulated backscatter communication system of the present invention can operate in two modes—one in which the backscattered signal is modulated to provide a high data rate Uplink communication channel, and one in which the backscattered channel is modulated with a low data rate signal, perhaps a single tone, to provide an Uplink acknowledgment signal that can be detected at great distances. In another system arrangement, we disclose a method for building a demodulator/symbol synchronization and recovery unit to handle both modes. This arrangement works for a backscatter communication system using a phase modulated subcarrier with differential encoding. Differential encoding means that the data is encoded in the changes in the subcarrier phase. A continuous tone subcarrier is therefore equivalent to the bit sequence {0, 0, 0 ... }.

Figure 6:
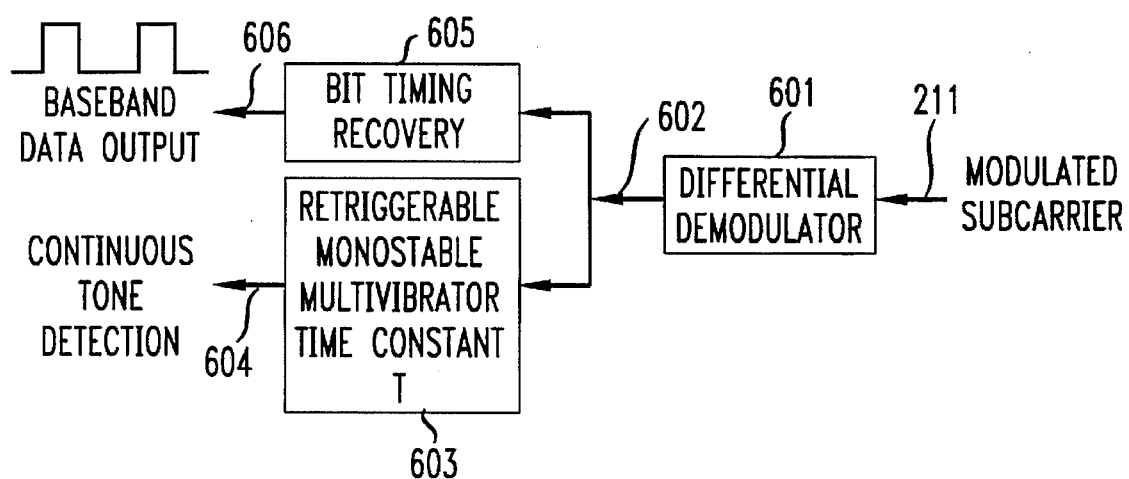
FIG. 6 shows Interrogator receiver circuits for demodulating differential encoded modulated subcarrier signals.

Shown in FIG. 6 is an Interrogator 103 having receiver circuits for demodulating the differentially encoded subcarrier signal. When a modulated carrier 211 is fed into the differential demodulator 601, the demodulator 601 output is a baseband data stream 602. When the baseband data stream has 0 to 1 and 1 to 0 transitions frequently enough, the retriggerable monostable multivibrator 603 is continually re-triggered, and its output 604 does not change. If, however, the demodulator 601 output has a string of 0's or 1's that last longer than the monostable's 603 time constant T, the monostable's output 604 changes, signaling the presence of the string of 0's or 1's (a long string of 0's or 1's indicates the presence of a continuous tone at the input of the demodulator 601). The Bit Timing Recovery Circuit 605 generates the baseband data output signal 606.

When there is no subcarrier signal present at the demodulator input, assume that the Demodulator 601 produces random output with transitions typically much more frequently than the time period T, so the Monostable 603 is continuously re-triggered. This means that the Interrogator 103 can distinguish a "no signal present" condition from a "constant tone present" condition at the demodulator output.

Note that the retriggerable monostable 603 is only one possible implementation of this idea. More sophisticated statistics could be performed on the demodulator input 211 to detect a possibly weak tone in a noisy background. In one embodiment, the Processor 200 of Interrogator 103 is used to implement the Bit Timing Recovery Circuit 605 and Monostable Circuit 603.

Figure 2:
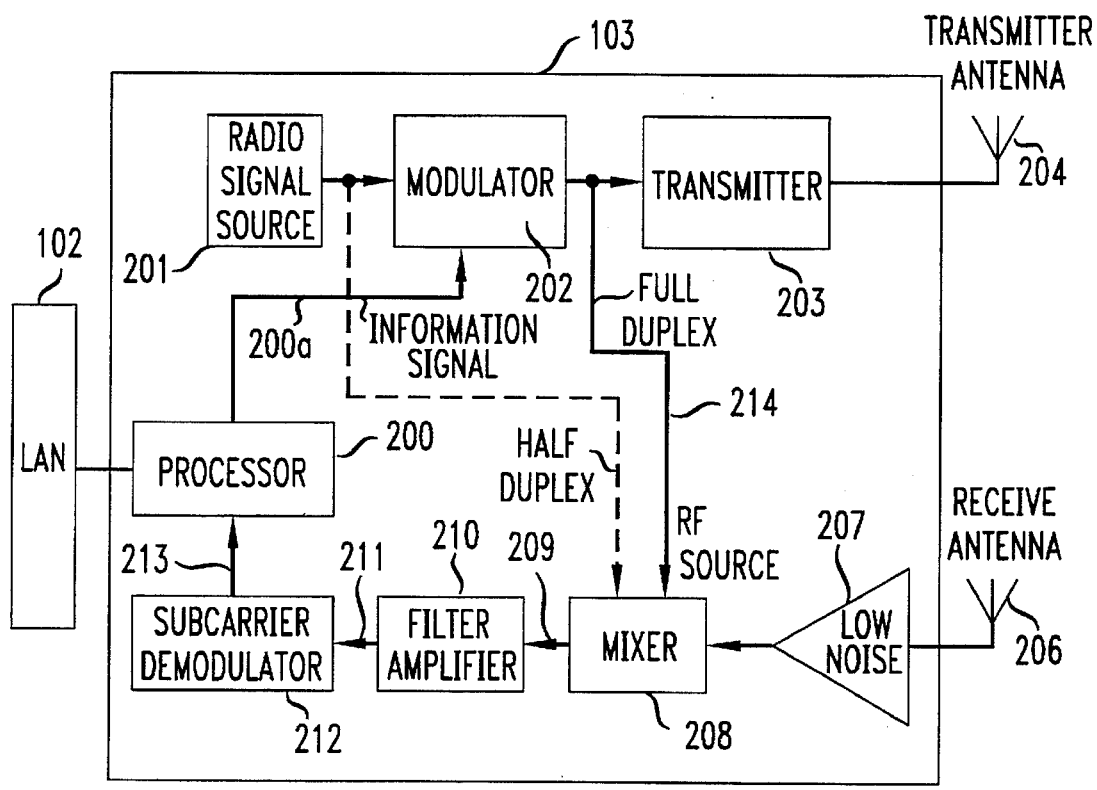
FIG. 2 shows a block diagram of an illustrative Interrogator Unit used in the RFID system of FIG. 1.
Figure 7:
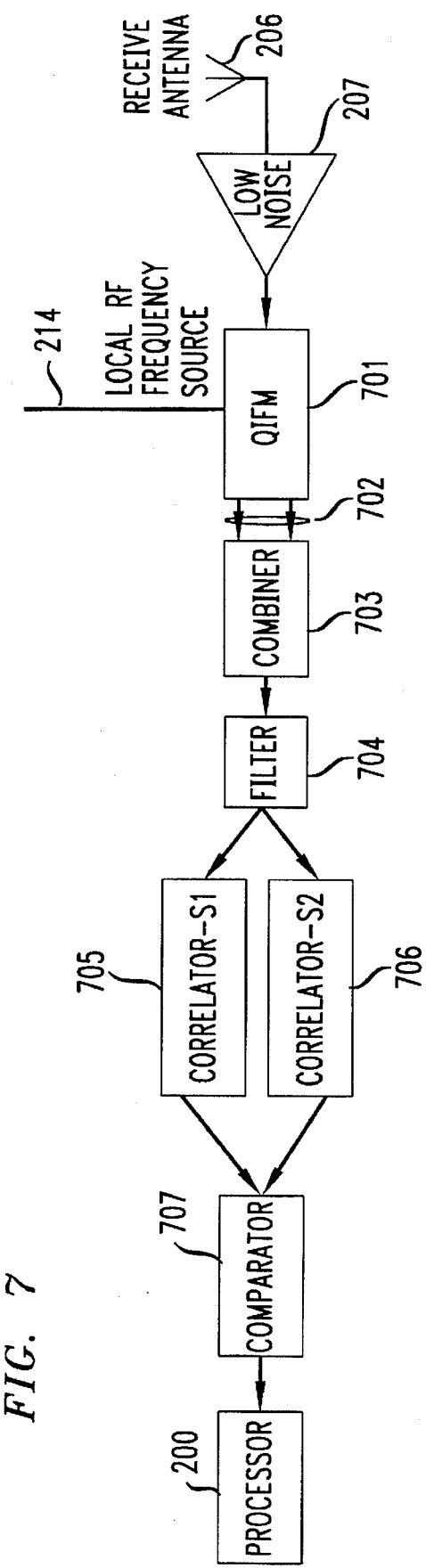
FIG. 7 shows Interrogator receiver circuits for demodulating pseudorandom codes encoded in the modulated subcarrier signals.

For the case in which the Tag is sending two pseudorandom sequences, the receiver circuits of Interrogator 103 of FIG. 2 are modified as follows in FIG. 7. The Receive Antenna 206 receives the modulated radio frequency signal which is then amplified by Low Noise Amplifier 207 and demodulated by Quadrature Mixer (QIFM) 701. The I and Q channel signals 703 outputted from QIFM 701 are combined (square root of the sum of the squares) in Combiner 703, then filtered by Filter 704, and then the result sent into two Correlators 705 and 706, one for pattern $S_1$ and one for pattern $S_2$. The outputs of the Correlators 705 and 706 are sent to a Comparator 707 to determine if the result is a "0" or a "1" signal. The output of the Comparator 707 is then sent to the Processor 200 to perform Uplink message synchronization.

What has been described is merely illustrative of the application of the principles of the present invention. Other arrangements and methods can be implemented by those skilled in the art without departing from the spirit and scope of the present invention.

We claim:

1. A radio communication system comprising
    an interrogator including
        means for generating a first modulated signal by modulating a first information signal onto a radio carrier signal, said first information signal indicating to which of multiple response modes a receiving tag should respond,
        means for transmitting said first modulated signal to said at least one tag,
    said at least one tag including
        means for receiving said first modulated signal,
        means for decoding said first modulated signal to obtain said first information signal,
        backscatter modulator means for modulating a reflection of said first modulated signal using a second information signal whose content, data rate, or modulation is determined from the contents of said first information signal, thereby forming a reflected second modulated signal, said interrogator further including
means for receiving said second modulated signal, and
means for demodulating said second modulated signal, to obtain said second information signal, whose content, data rate, or modulation was determined from the contents of said first information signal.

2. The radio communication system of claim 1 wherein said first modulated signal is generated using a first modulation type selected from a group including at least amplitude, phase, frequency, time-division, and code-division modulation types.

3. The radio communication system of claim 1 wherein the interrogator demodulating means includes a homodyne detector and uses said first modulated signal as the frequency source input to said detector.

4. The radio communication system of claim 1 wherein said first information signal indicates which of a first mode, including a data message in said second information signal, and a second mode, including an acknowledgment message in said second information signal, that said at least one tag should respond.

5. The radio communication system of claim 4 wherein said second information signal consists of a single bit of information.

6. The radio communication system of claim 5 wherein said single bit of information is communicated by the presence or absence of a single subcarrier tone backscatter modulating said first modulated signal.

7. The radio communication system of claim 1 when said at least one tag responds in said first mode, wherein
the bits of information contained within said second information signal are differentially encoded, and wherein
said demodulating means demodulates the differentially encoded bits to recover the data within said second information signal.

8. The radio communication system of claim 1 when said at least one tag responds in said second mode, wherein
the bits of information contained within said second information signal are differentially encoded, and wherein
said demodulating means demodulates the differentially encoded bits to recover the data within said second information signal.

9. The radio communication system of claims 7 or 8, wherein said interrogator includes
means for providing a retriggerable monostable multivibrator function to detect the acknowledgment message.

10. The radio communication system of claim 1 wherein said interrogator includes
processor means for performing a Fourier Transform to obtain said second information signal.

11. A tag for use in a radio communication system comprising
means for receiving said first modulated signal,
means for decoding said first modulated signal to obtain said first information signal, said first information signal indicating in which of multiple response modes a receiving tag should respond,
backscatter modulator means for modulating the reflection of said first modulated signal using a second information signal whose content, data rate, or modulation is determined by said first information signal, thereby forming a reflected second modulated signal.

12. A radio communication system comprising
an interrogator including
means for generating a first modulated signal by modulating a first information signal onto a radio carrier signal, said first information signal indicating which of multiple response modes a receiving tag should respond,
means for transmitting to said at least one tag during a first time interval said first modulated signal, and transmitting said radio carrier signal during a second time interval,
said at least one tag including
means for receiving said radio carrier signal and said first modulated signal,
means for decoding said first modulated signal to obtain said first information signal,
backscatter modulator means for modulating the reflection, during said second time interval, of said radio carrier signal using a second information signal whose content, data rate, or modulation is determined from the contents of said first information signal, thereby forming a reflected second modulated signal,
said interrogator further including
means for receiving said second modulated signal, and
means for demodulating said second modulated signal, to obtain said second information signal, whose content, data rate, or modulation was determined from the contents of said first information signal.

13. The radio communication system of claim 12 wherein said first information signal indicates which of a first mode, including a data message in said second information signal, and a second mode, including an acknowledgment message in said second information signal, that said at least one tag should respond.

14. The radio communication system of claim 13 wherein said second information signal consists of a single bit of information.

15. The radio communication system of claim 14 wherein said single bit of information is communicated by the presence or absence of a single subcarrier tone backscatter modulating said radio carrier signal.

16. The radio communication system of claim 12 when said at least one tag responds in said first mode, wherein
the bits of information contained within said second information signal are differentially encoded, and wherein
said demodulating means demodulates the differentially encoded bits to recover the data within said second information signal.

17. The radio communication system of claim 12 when said at least one tag responds in said second mode, wherein
the bits of information contained within said second information signal are differentially encoded, and wherein
said demodulating means demodulates the differentially encoded bits to recover the data within said second information signal.

18. The radio communication system of claims 16 or 17, wherein said interrogator includes
means for providing a retriggerable monostable multivibrator function to detect the acknowledgment message.

19. The radio communication system of claim 12 wherein said interrogator includes
processor means for performing a Fourier Transform to obtain said second information signal.

20. The radio communication system of claim 12 wherein said first modulated signal is generated using a first modulation type selected from a group including at least amplitude, phase, frequency, time-division, and code-division modulation types.

21. The radio communication system of claim 12 wherein the interrogator demodulating means includes a homodyne detector and uses said radio carrier signal as the frequency source input to said detector.

22. A method of operating a radio communication system comprising the steps of at an interrogator generating a first modulated signal by modulating a first information signal onto a radio carrier signal, said first information signal indicating which of multiple response modes a receiving tag should respond, transmitting said first modulated signal to said at least one tag;

at said at least one tag receiving said first modulated signal, decoding said first modulated signal to obtain said first information signal, modulating, using a backscatter modulator, a reflection of said first modulated signal using a second information signal whose content, data rate, or modulation is determined from the contents of said first information signal, thereby forming a reflected second modulated signal;

at said interrogator receiving said second modulated signal, and demodulating said second modulated signal, to obtain said second information signal, whose content, data rate, or modulation was determined from the contents of said first information signal.

23. A method of operating a tag for use in a radio communication system comprising the steps of receiving a first modulated signal, decoding said first modulated signal to obtain said first information signal, said first information signal indicating in which of multiple response modes a receiving tag should respond, modulating, using a backscatter modulator, a reflection of said first modulated signal using a second information signal whose content, data rate, or modulation is determined by said first information signal, thereby forming a reflected second modulated signal.

24. A method of operating a radio communication system comprising the steps of at an interrogator generating a first modulated signal by modulating a first information signal onto a radio carrier signal, said first information signal indicating which of multiple response modes a receiving tag should respond, transmitting to said at least one tag during a first time interval said first modulated signal, and transmitting said radio carrier signal during a second time interval;

at said at least one tag receiving said radio carrier signal and said first modulated signal, decoding said first modulated signal to obtain said first information signal, modulating, using a backscatter modulator, a reflection, during said second time interval, of said radio carrier signal using a second information signal whose content, data rate, or modulation is determined from the contents of said first information signal, thereby forming a reflected second modulated signal;

at said interrogator receiving said second modulated signal, and demodulating said second modulated signal, to obtain said second information signal, whose content, data rate, or modulation was determined from the contents of said first information signal.

25. A tag for use in a radio communication system comprising means for receiving a radio carrier signal and a first modulated signal, means for decoding said first modulated signal to obtain said first information signal, said first information signal indicating in which of multiple response modes a receiving tag should respond, backscatter modulator means for modulating the reflection of said radio carrier signal using a second information signal whose content, data rate, or modulation is determined by said first information signal, thereby forming a reflected second modulated signal.

26. A method of operating a tag for use in a radio communication system comprising the steps of receiving a radio carrier signal and a first modulated signal, decoding said first modulated signal to obtain said first information signal, said first information signal indicating in which of multiple response modes a receiving tag should respond, modulating, using a backscatter modulator, a reflection of said radio carrier signal using a second information signal whose content, data rate, or modulation is determined by said first information signal, thereby forming a reflected second modulated signal.

\* \* \* \* \*

UNITED STATES PATENT AND TRADEMARK OFFICE
CERTIFICATE OF CORRECTION

| | | |
|---|---|---|
| PATENT NO. | : 5,649,295 | Page 1 of 1 |
| APPLICATION NO. | : 08/492173 | |
| DATED | : July 15, 1997 | |
| INVENTOR(S) | : R. Anthony Shober et al. | |

It is certified that error appears in the above-identified patent and that said Letters Patent is hereby corrected as shown below:

In column 11, line 15, "signal to said at least" should read as -- signal to at least --.

In column 11, line 36, "signal to obtain said first" should read as -- signal to obtain a first --.

In column 11, line 50 "indicating which of multiple" should read as --indicating in which of multiple --.

In column 12, line 1, "transmitting to said at least" should read as -- transmitting to at least --.

In column 12, line 27 "said first information signal" should read as -- a first information signal --.

In column 12, line 39 "to obtain said first" should read as -- to obtain a first --.

Signed and Sealed this

Twenty-fourth Day of October, 2006

JON W. DUDAS
*Director of the United States Patent and Trademark Office*